(12) United States Patent
Ishizaka

(10) Patent No.: US 10,459,902 B2
(45) Date of Patent: Oct. 29, 2019

(54) INFORMATION PROCESSING DEVICE, VECTOR DATA PROCESSING METHOD, AND RECORDING MEDIUM

(71) Applicant: NEC Corporation, Minato-ku, Tokyo (JP)

(72) Inventor: Kazuhisa Ishizaka, Tokyo (JP)

(73) Assignee: NEC CORPORATION, Tokyo (JP)

(*) Notice: Subject to any disclaimer, the term of this patent is extended or adjusted under 35 U.S.C. 154(b) by 510 days.

(21) Appl. No.: 15/315,469

(22) PCT Filed: Jun. 11, 2015

(86) PCT No.: PCT/JP2015/002923
§ 371 (c)(1),
(2) Date: Dec. 1, 2016

(87) PCT Pub. No.: WO2015/194132
PCT Pub. Date: Dec. 23, 2015

(65) Prior Publication Data
US 2017/0199907 A1      Jul. 13, 2017

(30) Foreign Application Priority Data

Jun. 19, 2014   (JP) ................................. 2014-125864

(51) Int. Cl.
| | | |
|---|---|---|
| *G06F 16/00* | (2019.01) | |
| *G06F 16/22* | (2019.01) | |
| *G06F 17/16* | (2006.01) | |
| *G06T 7/00* | (2017.01) | |
| *G06F 7/02* | (2006.01) | |
| *G06K 9/62* | (2006.01) | |
| *G06T 9/00* | (2006.01) | |

(52) U.S. Cl.
CPC ............ *G06F 16/2237* (2019.01); *G06F 7/02* (2013.01); *G06F 17/16* (2013.01); *G06K 9/6201* (2013.01);
(Continued)

(58) Field of Classification Search
CPC ..... G06K 9/6201; G06K 9/6215; G06T 9/008; G06F 17/16; G06F 7/02
See application file for complete search history.

(56) References Cited

U.S. PATENT DOCUMENTS 5,551,039 A *   8/1996   Weinberg ................ G06F 8/445
                                                              712/10
6,553,059 B1    4/2003   Ito
(Continued)

FOREIGN PATENT DOCUMENTS

| EP | 2073146 A1 | 6/2009 |
| JP | H11-205283 | 7/1999 |

(Continued)

OTHER PUBLICATIONS

J. E. Smith, Greg Faanes, and Rabin Sugumar, "Vector Instruction Set Support for Conditional Operations", 2000, ACM, pp. 260-269. (Year: 2000).*

(Continued)

*Primary Examiner* — Cheryl Lewis

(57) ABSTRACT

Matching processing between pieces of vector data is accelerated. A matching device 100 performs, for a plurality of pieces of vector data each having a plurality of dimensions, a predetermined operation pertaining to each dimension of each piece of vector data. The matching device 100 includes a collective operation unit 150 and an individual operation unit 160. The collective operation unit 150 performs the predetermined operation pertaining to a specific dimension among the plurality of dimensions by a vector operation for different pieces of vector data in the plurality of pieces of vector data. The individual operation unit 160 performs the predetermined operation pertaining to each dimension other than the specific dimension for a piece of vector data that satisfies a predetermined condition among the plurality of pieces of vector data.

10 Claims, 22 Drawing Sheets

(52) U.S. Cl.
CPC .............. *G06K 9/6215* (2013.01); *G06T 7/00* (2013.01); *G06T 9/008* (2013.01)

(56) References Cited

U.S. PATENT DOCUMENTS

| | | | | |
|---|---|---|---|---|
| 6,788,303 | B2* | 9/2004 | Baldwin | G06F 9/30036 345/522 |
| 7,007,019 | B2* | 2/2006 | Kanno | G06F 16/338 |
| 7,587,382 | B2* | 9/2009 | Yamamoto | H04N 21/482 |
| 2002/0026569 | A1* | 2/2002 | Liao | G06F 9/30014 712/4 |
| 2010/0150452 | A1* | 6/2010 | Kamei | G06K 9/00087 382/202 |
| 2011/0274317 | A1* | 11/2011 | Oami | H04N 5/144 382/103 |

FOREIGN PATENT DOCUMENTS

| | | |
|---|---|---|
| WO | 0101692 A1 | 1/2001 |
| WO | 2008/044380 A1 | 4/2008 |
| WO | 2010007211 A1 | 1/2010 |

OTHER PUBLICATIONS

Allen Gersho, "On the Structure of Vector Quantizers", IEEE Transactions on Information Theory, vol. 28, Mar. 1982, pp. 157-166. (Year: 1982).*
Communication dated Apr. 6, 2018, from the European Patent Office in counterpart European Application No. 15810354.9.
Yu-Chen Hu, et al., "Fast VQ codebook search algorithm for grayscale image coding", Elsevier, ScienceDirect, Image and Vision Computing, vol. 26, No. 5, 2008, pp. 657-666, XP022502996.
Chang-Da Bei, et al., "An Improvement of Minimum Distortion Encoding Algorithm for Vector Quantization", IEEE Transactions on Communications, vol. COM-33, No. 10, Oct. 1985, pp. 1132-1133, XP008061499.
Chin-Chen Chang, et al., "A Fast VQ codebook search with initialization and search order", Elsevier, SciVerse ScienceDirect, Information Sciences, vol. 183, No. 1, 2012, pp. 132-139, XP028328301.
International Search Report for PCT Application No. PCT/JP2015/002923, dated Sep. 8, 2015.
English translation of Written opinion for PCT Application No. PCT/JP2015/002923.

* cited by examiner

Fig. 10

```
 1: d[0:11] = 0;
 2: K = 1;
 3:
 4: for (j = 0; j < K; ++j) {
 5: #pragma vector
 6:     for (i = 0; i < 12; ++i) {
 7:         d[i] += (u[j][i] - v[j])^2;
 8:         result[i] = d[i] < T;
 9:     }
10: }
11:
12: for (j = K; j < 8; ++j) {
13: #pragma novector
14:     for (i = 0; i < 12; ++i) {
15:         if (result[i]) {
16:             d[i] += (u[j][i] - v[j])^2;
17:             result[i] = d[i] < T;
18:         }
19:     }
20: }
```

DOTTED LINE PORTION: UNCALCULATED
SHADE PORTION: CALCULATION NOT REQUIRED
WITHIN BOLD FRAME: CALCULATED BY VECTOR INSTRUCTION

Fig. 15

```
1:  d[0:11] = 0;
2:  K = 1;
3:
4:  for (j = 0; j < K; ++j) {
5:  #pragma vector
6:      for (i = 0; i < 12; ++i) {
7:          d[i] += (u[j][i] - v[j])^2;
8:          result[i] = d[i] < T;
9:      }
10: }
11:
12: for (i = 0; i < 12; ++i) {
13: #pragma novector
14:     if (d[i] < T) {
15:         for (j = K; j < 8; ++j) {
16:             d[i] += (u0[i][j] - v[j])^2;
17:             if (d[i] >= T)
18:                 break;
19:         }
20:         if (d[i] < T)
21:             result[i] = true;
22:     }
23: }
```

Fig. 17

```
 1: d[0:11] = 0;
 2: K = 1;
 3:
 4: for (j = 0; j < K; ++j) {
 5: #pragma vector
 6:    for (i = 0; i < 12; ++i) {
 7:        d[i] += (u[j][i] - v[j])^2;
 8:        result[i] = d[i] < T;
 9:    }
10: }
11:
12: count[0:7] = 0;
13:
14: for (j = K; j < 8; ++j) {
15: #pragma novector
16:    for (i = 0; i < 12; ++i) {
17:        if (result[i]) {
18:            d[i] += (u[j][i] - v[j])^2;
19:            result[i] = d[i] < T;
20:            count[j]++;
21:        }
22:    }
23: }
24:
25: for (i = K; i < 8; ++i) {
26:    if (count[i] < C)
27:        break;
28: }
29: K = i;
```

```
 1: result[0:11] = false;
 2:
 3: for (i = 0; i < 12; ++i) {
 4:     float d = 0.0;
 5:     for (j = 0; j < 8; ++j) {
 6:         d += (u[i][j] - v[j])^2;
 7:     }
 8:     if (d < T)
 9:         result[i] = true;
10: }
```

```
 1: result[0:11] = false;
 2:
 3: for (i = 0; i < 12; ++i) {
 4:     float d = 0.0;
 5:     for (j = 0; j < 8; ++j) {
 6:         d += (u[i][j] - v[j])^2;
 7:         if (d >= T)
 8:             break;
 9:     }
10:     if (d < T)
11:         result[i] = true;
12: }
```

DOTTED LINE PORTION: UNCALCULATED
SHADE PORTION: CALCULATION NOT REQUIRED

DOTTED LINE PORTION: UNCALCULATED
SHADE PORTION: CALCULATION NOT REQUIRED
WITHIN BOLD FRAME: CALCULATED BY VECTOR INSTRUCTION

INFORMATION PROCESSING DEVICE, VECTOR DATA PROCESSING METHOD, AND RECORDING MEDIUM

This application is a National Stage Entry of PCT/JP2015/002923 filed on Jun. 11, 2015, which claims priority from Japanese Patent Application 2014-125864 filed on Jun. 19, 2014, the contents of all of which are incorporated herein by reference, in their entirety.

TECHNICAL FIELD

The present invention relates to an information processing device, a vector data processing method, and a recording medium.

BACKGROUND ART

Image matching processing that determines coincidences among a plurality of images is typically performed by comparing feature quantities that are extracted from the images. For example, an image search system matches each of a plurality of images against an input image by comparing the feature quantities of the plurality of images stored in a database and a feature quantity obtained from the input image. In general, a feature quantity is represented by multidimensional vector data that is referred to as a feature vector.

FIG. 19 is a diagram illustrating an example of calculating a distance between pieces of vector data in typical matching processing.

Comparison of vector data is typically performed by calculating differences for respective elements between two pieces of vector data of comparison targets and comparing the aggregated value of the differences with a threshold. In this description, the aggregated difference is referred to as a distance, and a calculation of the distance between two pieces of vector data is referred to as a distance calculation. For example, when each element of vector data is represented by a single value, the sum of absolute values of differences of the values for respective elements is used as a distance. In other words, when two pieces of vector data are a and b, a distance between the vector data a and b is calculated by $\Sigma |a[j]-b[j]|$ as illustrated in FIG. 19. Here, $a[j]$ and $b[j]$ respectively indicate j-th elements of pieces of the vector data a and b, and $\Sigma$ indicates accumulation with respect to all the elements. In comparing of the calculated distance, for example, when the distance is equal to or less than a predetermined comparison threshold, the two pieces of vector data are determined as coinciding with each other. On the other hand, when the distance is larger than the predetermined comparison threshold, the two pieces of vector data may be determined as not coinciding with each other.

In the matching processing of an image search system, a distance is calculated between each piece of vector data in a database and vector data of a search target.

FIG. 20 is an example of a typical matching processing program. In the example of FIG. 20, the number of pieces of vector data in a database is 12 and the number of elements in each piece of the vector data is 8. Here, $u[i][j]$ is a j-th element of an i-th piece of vector data in the database, $v[j]$ is a j-th element of vector data of a search target. T is a comparison threshold and, when a distance d is smaller than T, the i-th piece of vector data in the database and the vector data of the search target are determined as coinciding with each other (line numbers 8 and 9).

When a large amount of vector data is included in a database, lengthy search time becomes a problem. To reduce search time, it is essential to accelerate a distance calculation between pieces of vector data.

The method of accelerating a distance calculation between pieces of vector data includes, for example, truncation determination. FIG. 21 is a diagram illustrating an application example of the truncation determination in typical matching processing. In the truncation determination, a distance obtained by accumulating only differences of some elements of vector data in the middle of accumulation, is compared with a predetermined truncation threshold. Then, when the distance in the middle of accumulation is equal to or more than the truncation threshold (when satisfying the truncation condition), a further distance calculation is determined as unnecessary and the distance calculation ends as illustrated in FIG. 21 (truncation processing).

FIG. 22 is an example of a program that adapts truncation determination in typical matching processing. In the example of FIG. 22, when a distance in the middle of accumulation is equal to or more than a truncation threshold T, truncation processing is performed (line numbers 7 and 8). In this case, the comparison threshold T is used as a truncation threshold.

FIG. 23 is a diagram illustrating an example of elements, for which difference calculations are performed, when truncation determination is adapted in typical matching processing. In the example of FIG. 23, the elements indicated by shades represent elements, for which difference calculations are not performed (difference calculations are not required), and the other portion represents elements, for which difference calculations are performed (difference calculations are necessary) among vector data $u[0] \ldots u[11]$ in a database. In this case, difference calculations are performed for all dimensions with respect to vector data $u[2]$, while a difference calculation is performed only for the first dimension with respect to other vector data. In other words, difference calculations are performed 19 times for 19 elements.

For example, PTL 1 discloses an example of a system where such truncation determination is performed for calculating a distance between pieces of vector data in image matching.

CITATION LIST

Patent Literature

PTL 1: International Publication No. WO2008/044380

SUMMARY OF INVENTION

Technical Problem

Another method of accelerating a distance calculation between pieces of vector data is a method using vector instructions of a Central Processing Unit (CPU). FIG. 24 is a diagram illustrating an application example of vector instructions in typical matching processing. A vector instruction is for performing the same processing for a plurality of pieces of data with a single instruction (a vector operation) in the CPU. A vector instruction can be processed in shorter time than processing the same instruction for each of a plurality of pieces of data. A distance calculation between pieces of vector data can be accelerated by using a vector instruction for calculating differences for respective elements as illustrated in FIG. 24. In the example of FIG. 24, a single vector instruction includes calculations for four elements.

In addition, to further accelerate a distance calculation between pieces of vector data, both the above described truncation determination and vector instructions may be used. FIG. 25 is a diagram illustrating an application example of truncation determination and a vector instruction in typical matching processing. In this case, as illustrated in FIG. 25, a vector instruction calculates a plurality of elements, the result of which is used for performing truncation determination. Since truncation determination is not performed in the middle of a vector instruction, as indicated by shades within a bold frame in FIG. 25, unnecessary calculations are performed even for dimensions that do not require difference calculations.

FIG. 26 is a diagram illustrating an example of elements, for which difference calculations are performed, when truncation determination and vector instructions are applied in typical matching processing. In the example of FIG. 26, the elements within the bold frames represent elements, for which difference calculations are collectively performed by vector instructions. In this case, although 19 elements require difference calculations, difference calculations are performed for 52 elements by 13-time vector instructions. In other words, although the number of instructions is reduced to 13, calculations performed for 33 elements indicated by shades within the bold frames are unnecessary.

In this way, when both truncation determination and vector instructions are used for matching processing, although a plurality of difference calculations can be collectively performed, they create unnecessary calculations. Therefore, the effects of acceleration by the vector instructions are not fully attained.

The objective of the present invention is to provide an information processing device, a vector data processing method, and a recording medium that solve the above-described problems and accelerate matching processing between pieces of vector data.

Solution to Problem

An information processing device according to an exemplary aspect of the invention, that performs, for a plurality of pieces of vector data each having a plurality of dimensions, a predetermined operation pertaining to each dimension of each piece of vector data, the information processing device, includes: a collective operation means for performing the predetermined operation pertaining to a specific dimension among the plurality of dimensions by a vector operation for different pieces of vector data in the plurality of pieces of vector data; and an individual operation means for performing the predetermined operation pertaining to each dimension other than the specific dimension for a piece of vector data that satisfies a predetermined condition among the plurality of pieces of vector data.

A vector data processing method according to an exemplary aspect of the invention, for performing, for a plurality of pieces of vector data each having a plurality of dimensions, a predetermined operation pertaining to each dimension of each piece of vector data, the vector data processing method includes: performing collective operation processing that performs the predetermined operation pertaining to a specific dimension among the plurality of dimensions by a vector operation for different pieces of vector data in the plurality of pieces of vector data; and performing individual operation processing that performs the predetermined operation pertaining to each dimension other than the specific dimension for a piece of vector data that satisfies a predetermined condition among the plurality of pieces of vector data.

A computer readable storage medium according to an exemplary aspect of the invention records thereon a program for a computer for performing, for a plurality of pieces of vector data each having a plurality of dimensions, a predetermined operation pertaining to each dimension of each piece of vector data, the program causing the computer to execute processes including: a process for performing the predetermined operation pertaining to a specific dimension among the plurality of dimensions by a vector operation for different pieces of vector data in the plurality of pieces of vector data; and a process for performing the predetermined operation pertaining to each dimension other than the specific dimension for a piece of vector data that satisfies a predetermined condition among the plurality of pieces of vector data.

Advantageous Effects of Invention

The effect of the present invention is to accelerate matching processing between pieces of vector data.

BRIEF DESCRIPTION OF DRAWINGS

FIG. 10 is an example of a program of the matching device 100 according to the first exemplary embodiment of the present invention;

FIG. 15 is an example of a program of a matching device 100 according to the second exemplary embodiment of the present invention;

FIG. 17 is an example of a program of the matching device 100 according to the third exemplary embodiment of the present invention;

DESCRIPTION OF EMBODIMENTS

First Exemplary Embodiment

The following will describe the first exemplary embodiment of the present invention.

In the first exemplary embodiment of the present invention, vector data has a plurality of dimensions. A dimension number is assigned to each dimension of the vector data, in sequence from the top.

Matching vector data against other vector data is performed on the basis of a distance between vectors. A calculation of a distance between vectors is performed by a predetermined operation between elements of each dimension (calculation of a difference, calculation of the accumulated value of differences, and comparison of the accumulated value and a truncation threshold). It is assumed that the order, in which the predetermined operation is performed for each dimension, is determined in advance, for example, such as by the sequence of the dimension numbers.

Figure 2:
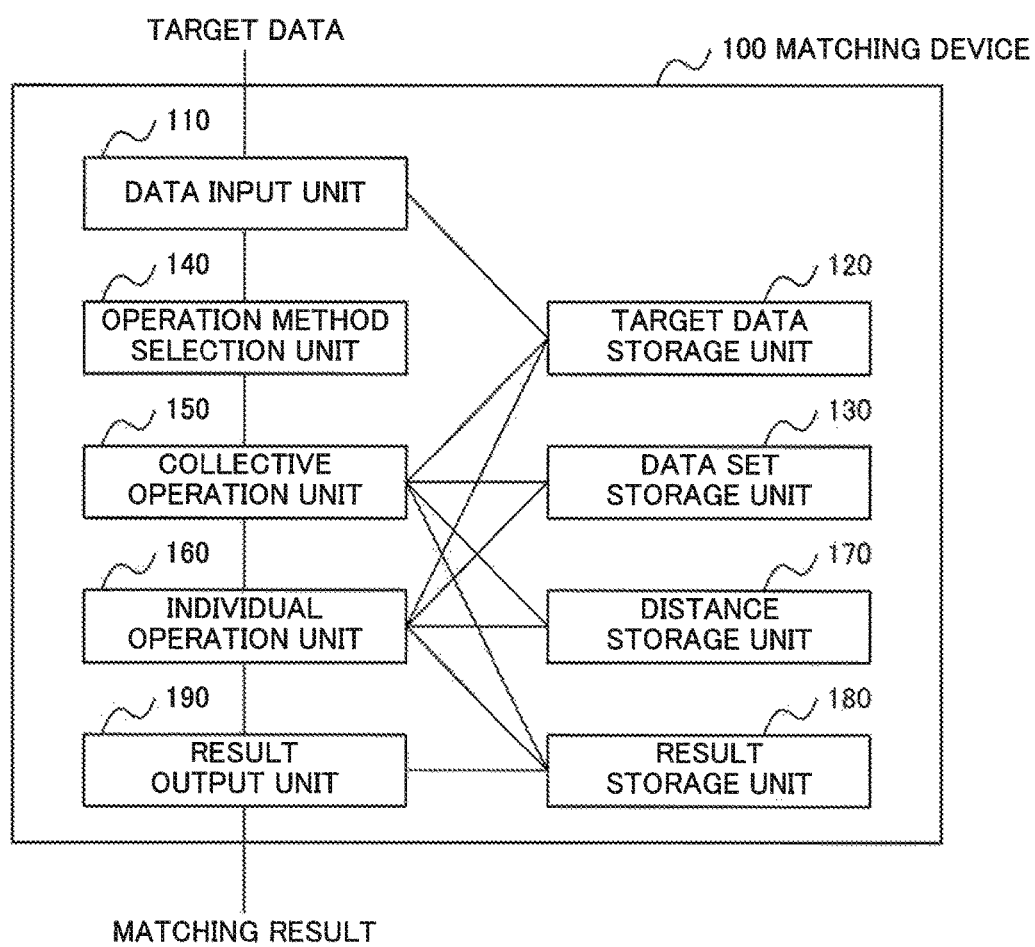
FIG. 2 is a block diagram illustrating a configuration of a matching device 100 according to the first exemplary embodiment of the present invention.

The following will describe a configuration of the first exemplary embodiment of the present invention. FIG. 2 is a block diagram illustrating a configuration of a matching device 100 according to the first exemplary embodiment of the present invention. The matching device 100 is an exemplary embodiment of an information processing device of the present invention.

The matching device 100 of the first exemplary embodiment of the present invention includes a data input unit 110, a target data storage unit 120, a data set storage unit 130, an operation method selection unit 140, a collective operation unit 150, an individual operation unit 160, a distance storage unit 170, a result storage unit 180, and a result output unit 190.

The data input unit 110 receives an input of vector data of a matching target (target vector data) from a user or the like.

The target data storage unit 120 stores the target vector data.

The data set storage unit 130 stores a set of vector data (a vector data set) to be used for matching against the target vector data. The vector data set is registered in advance by a user or the like.

The operation method selection unit 140 divides a plurality of dimensions of vector data into dimensions for which the above-described predetermined operation is performed using the collective operation unit 150 (specific dimensions) and dimensions for which the above-described predetermined operation is performed using the individual operation unit 160 (dimensions other than the specific dimensions). Then, the operation method selection unit 140 allocates the divided dimensions to the collective operation unit 150 and the individual operation unit 160.

For example, the operation method selection unit 140 allocates, from among a plurality of dimensions, dimensions of which order of the above-described predetermined operation is equal to or less than a predetermined value that is set in advance by a user or the like to the collective operation unit 150, and allocates dimensions that exceed the predetermined value to the individual operation unit 160. When the predetermined operation for each dimension is performed in the order of the dimension number, the operation method selection unit 140 allocates dimensions of which dimension number is equal to or less than a predetermined value to the collective operation unit 150, and allocates dimensions that exceed the predetermined value to the individual operation unit 160.

The collective operation unit 150 and the individual operation unit 160 respectively perform the above-described predetermined operation between vector data in a vector data set and target vector data for dimensions that are respectively allocated by the operation method selection unit 140.

The distance storage unit 170 stores, for each piece of vector data in the vector data set, the accumulated value of differences that are calculated for respective dimensions by the collective operation unit 150 and the individual operation unit 160.

The result storage unit 180 stores a comparison result between a comparison threshold and a distance between each piece of vector data and target vector data calculated by the collective operation unit 150 and the individual operation unit 160.

The result output unit 190 outputs the matching result to a user and the like.

Figure 3:
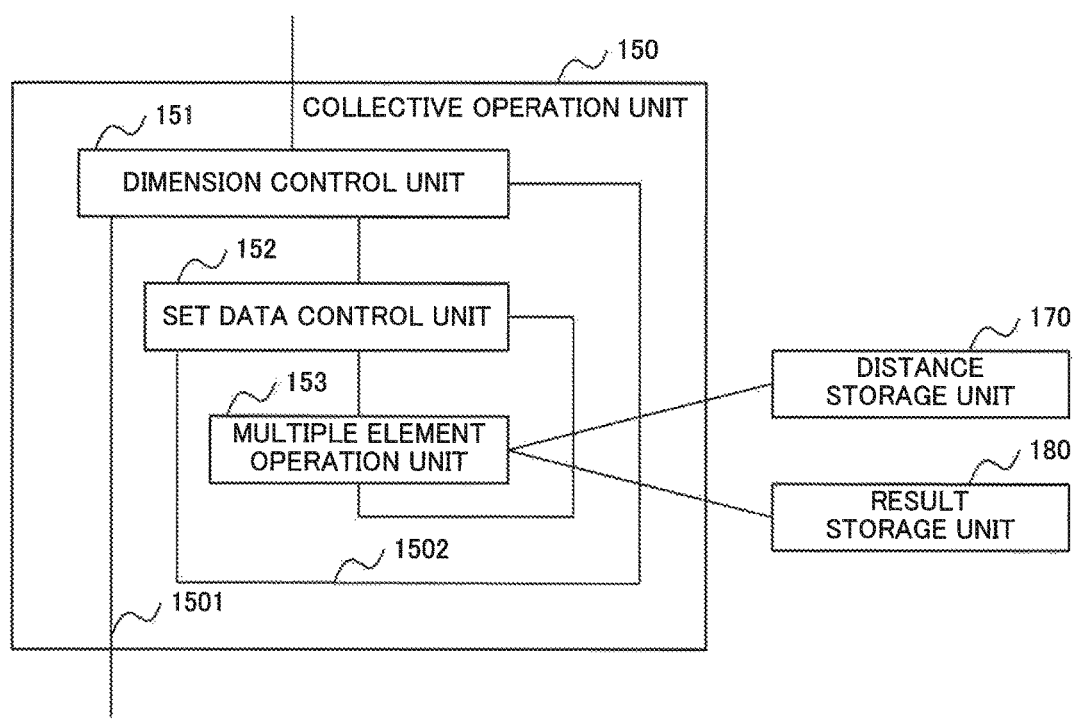
FIG. 3 is a diagram illustrating a configuration of a collective operation unit 150 according to the first exemplary embodiment of the present invention.

FIG. 3 is a diagram illustrating a configuration of the collective operation unit 150 according to the first exemplary embodiment of the present invention.

The collective operation unit 150 includes a dimension control unit 151, a set data control unit 152, and a multiple element operation unit 153.

The dimension control unit 151 selects a dimension one by one from a set of dimensions (a dimension set) allocated to the collective operation unit 150. The dimension control unit 151 typically selects a dimension one by one from the top of the allocated dimension set to the end and terminates the processing when the selection reaches the end (FIG. 3, reference number 1051). The set data control unit 152 selects a plurality of pieces of vector data from the vector data set. Typically, the number of pieces of vector data that are selected at once is the same as the number of pieces of data that can be simultaneously processed by a single vector instruction. Further, the set data control unit 152 typically selects vector data in the order from the top piece of vector data in the vector data set to the last piece of vector data, and terminates the processing when processing of the last piece of vector data ends (FIG. 3, reference number 1502). The multiple element operation unit 153 collectively performs the predetermined operations pertaining to the selected dimension for the selected plurality of pieces of vector data using a vector instruction. In other words, the multiple element operation unit 153 calculates a difference, for elements of the selected dimension, between each of the selected plurality of pieces of vector data and target vector data, and accumulates the difference in the distance storage unit 170. Further, the multiple element operation unit 153 compares the accumulated value and a comparison threshold for each of the selected plurality of pieces of vector data, and stores the comparison result in the result storage unit 180.

Figure 4:
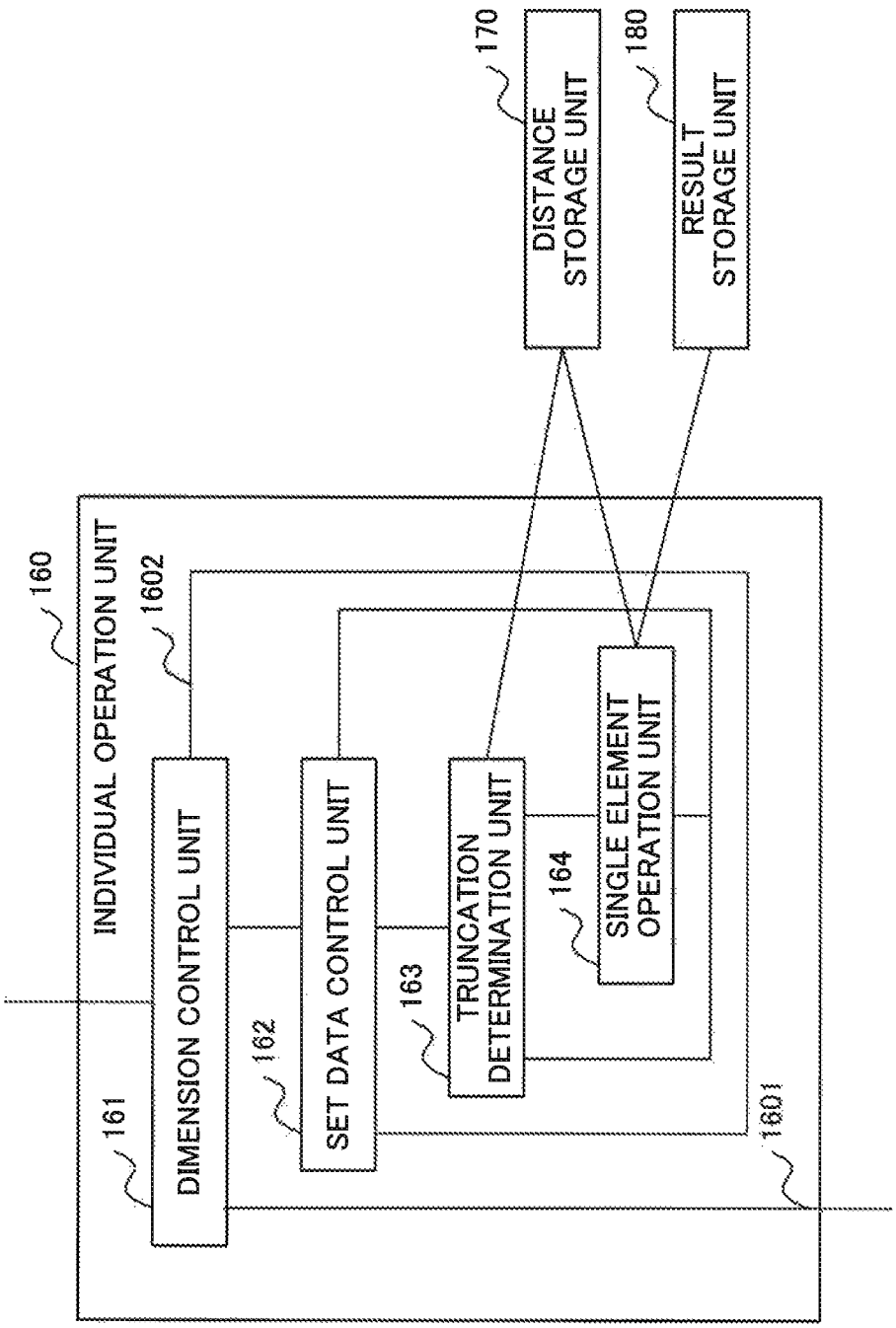
FIG. 4 is a diagram illustrating a configuration of an individual operation unit 160 according to the first exemplary embodiment of the present invention.

FIG. 4 is a diagram illustrating a configuration of the individual operation unit 160 according to the first exemplary embodiment of the present invention.

The individual operation unit 160 includes a dimension control unit 161, a set data control unit 162, a truncation determination unit 163, and a single element operation unit 164.

The dimension control unit 161 selects a dimension one by one from a dimension set allocated to the collective operation unit 160. The dimension control unit 161 typically selects a dimension one by one from the top of the allocated dimension set to the end and terminates the processing when the selection reaches the end (FIG. 4, reference number 1601). The set data control unit 162 selects a piece of vector data one by one from the vector data set. The set data control unit 162 typically selects vector data in the order from the top piece of vector data in the set to the last piece of vector data, and terminates the processing when processing of the last piece of vector data ends (FIG. 4, reference number 1602). The truncation determination unit 163 performs truncation determination for the selected one piece of vector data. Here, the truncation determination unit 163 compares the accumulated value of differences and a truncation threshold and determines whether the difference satisfies a truncation condition. When the difference does not satisfy the truncation condition (when the difference satisfies a predetermined condition), the single element operation unit 164 performs an operation pertaining to the selected dimension for the selected one piece of vector data. In other words, the single element operation unit 164 calculates a difference for elements of the selected dimension between the selected one piece of vector data and target vector data, and accumulates the difference in the distance storage unit 170. Further, the single element operation unit 164 compares the accumulated value and a comparison threshold for the selected one piece of vector data, and stores the comparison result in the result storage unit 180.

Figure 5:
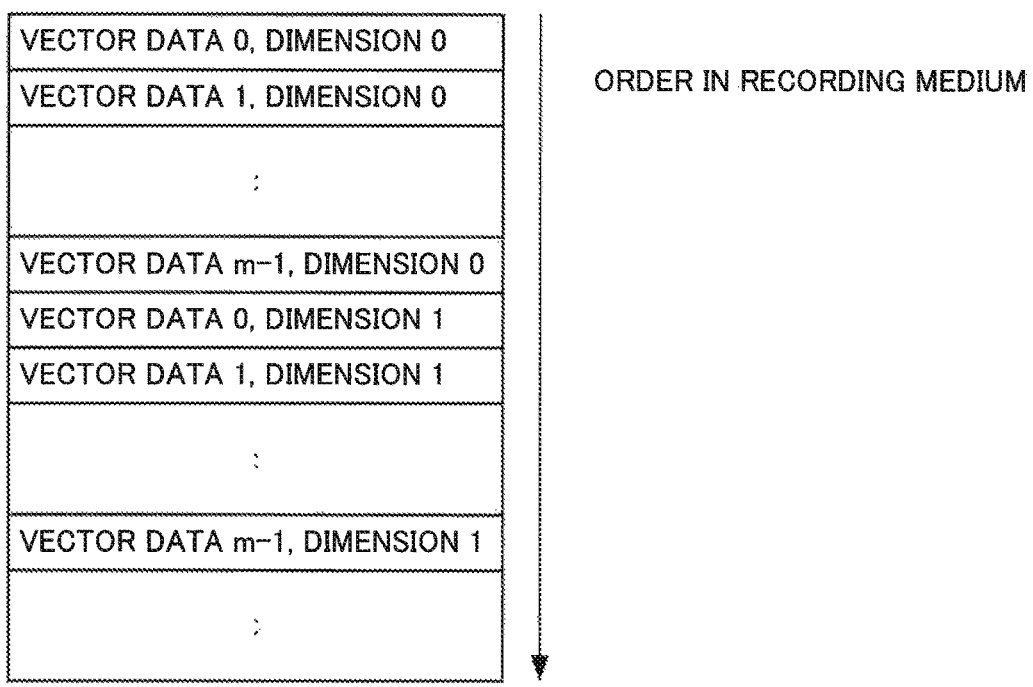
FIG. 5 is a diagram illustrating an example of a method of storing a vector data set in the recording medium according to the first exemplary embodiment of the present invention.

FIG. 5 is a diagram illustrating an example of a method of storing a vector data set in the recording medium according to the first exemplary embodiment of the present invention. In FIG. 5, m indicates the number of pieces of vector data.

In the first exemplary embodiment of the present invention, a single vector instruction performs operations for elements of the same dimension of different pieces of vector data in a vector data set. Thus, a method of storing a vector data set in a recording medium may preferably be a method where elements of different vector data pertaining to the same dimension are continuously stored as illustrated in FIG. 5.

It should be noted that the matching device 100 may be a computer that includes a CPU and a recording medium storing a program and operates by control according to the program.

Figure 6:
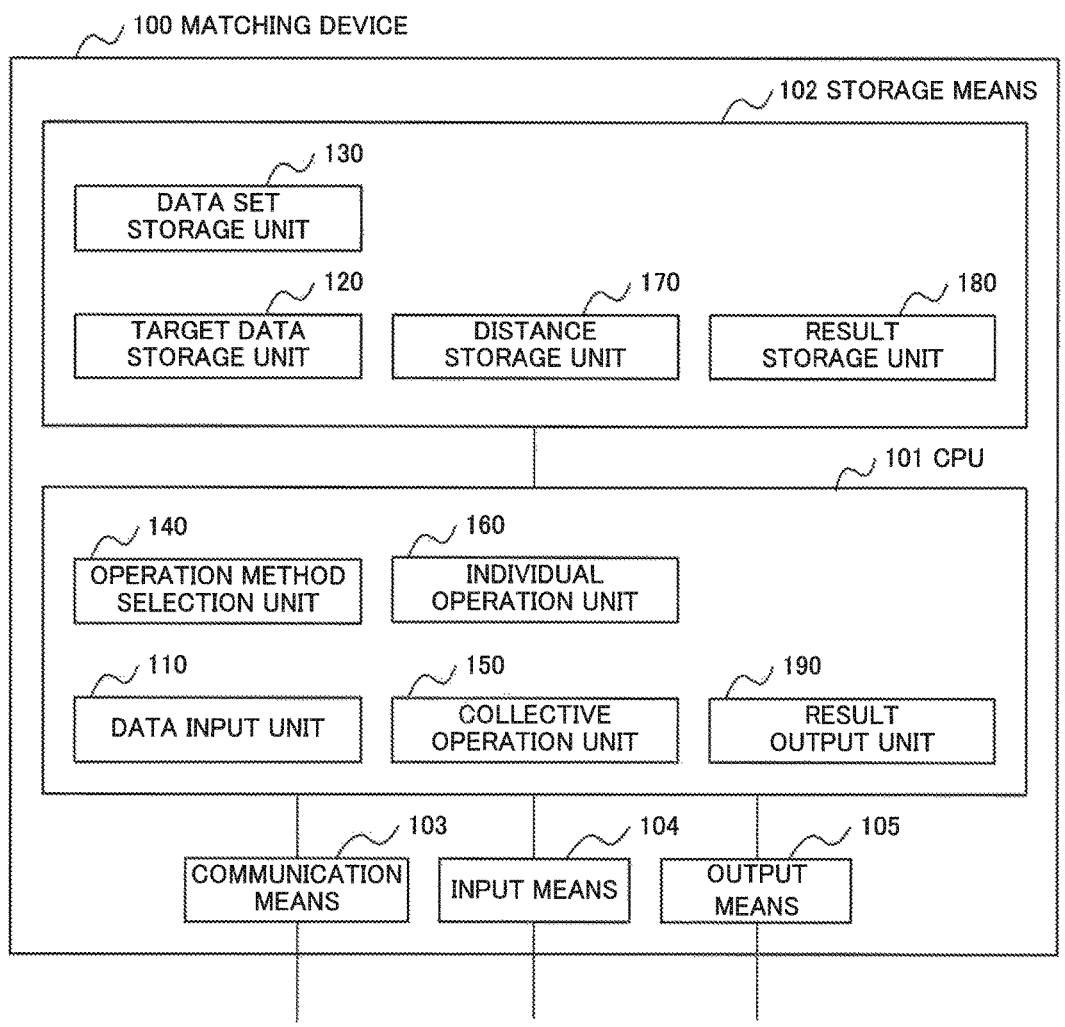
FIG. 6 is a block diagram illustrating a configuration of the matching device 100 implemented by a computer according to the first exemplary embodiment of the present invention.

FIG. 6 is a block diagram illustrating a configuration of the matching device 100 implemented by a computer according to the first exemplary embodiment of the present invention. The matching device 100 includes a CPU 101, recording means (a recording medium) 102, such as a hard disk and a memory, communication means 103 that communicates data with other devices, input means 104, such as a keyboard, and output means 105, such as a display.

The CPU 101 executes a computer program for implementing functions of a data input unit 110, an operation method selection unit 140, a collective operation unit 150, an individual operation unit 160, and a result output unit 190. The storage means 102 records data of the target data storage unit 120, the data set storage unit 130, the distance storage unit 170, and the result storage unit 180. The target data storage unit 120, the data set storage unit 130, the distance storage unit 170, and the result storage unit 180 may be configured by individual recording media or by a single recording medium. The input means 104 receives an input of target vector data and a vector data set. The output means 105 outputs a matching result. Further, the communication means 103 may receive an input of target vector data from other devices or output the matching result to other devices.

Alternatively, each component of the matching device 100 illustrated in FIG. 2 may be an individual logic circuit.

The following will describe the operation of the first exemplary embodiment of the present invention.

Figure 7:
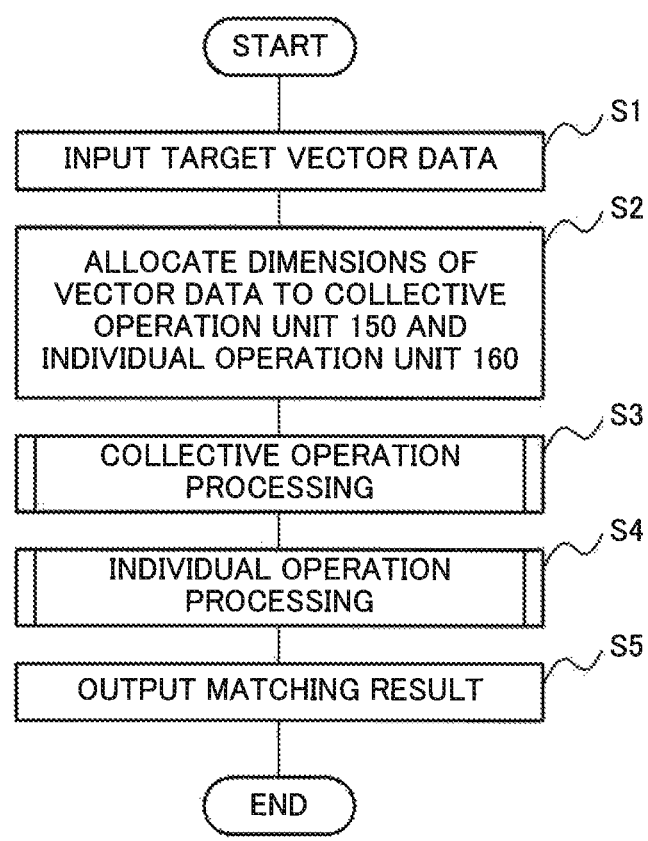
FIG. 7 is a flowchart illustrating operation of the matching device 100 according to the first exemplary embodiment of the present invention.

FIG. 7 is a flowchart illustrating the operation of the matching device 100 according to the first exemplary embodiment of the present invention.

The data input unit 110 receives an input of target vector data from a user or the like (step S1). The data input unit 110 stores the target vector data in the target data storage unit 120.

The operation method selection unit 140 divides the dimensions of the vector data into dimensions for which a predetermined operation is performed using the collective operation unit 150 and dimensions for which the predetermined operation is performed using the individual operation unit 160, and allocates the dimensions respectively to the collective operation unit 150 and the individual operation unit 160 (step S2).

The collective operation unit 150 performs collective operation processing for the allocated dimensions between each piece of vector data in a vector data set stored in the data set storage unit 130 and the target vector data stored in the target data storage unit 120 (step S3).

Figure 8:
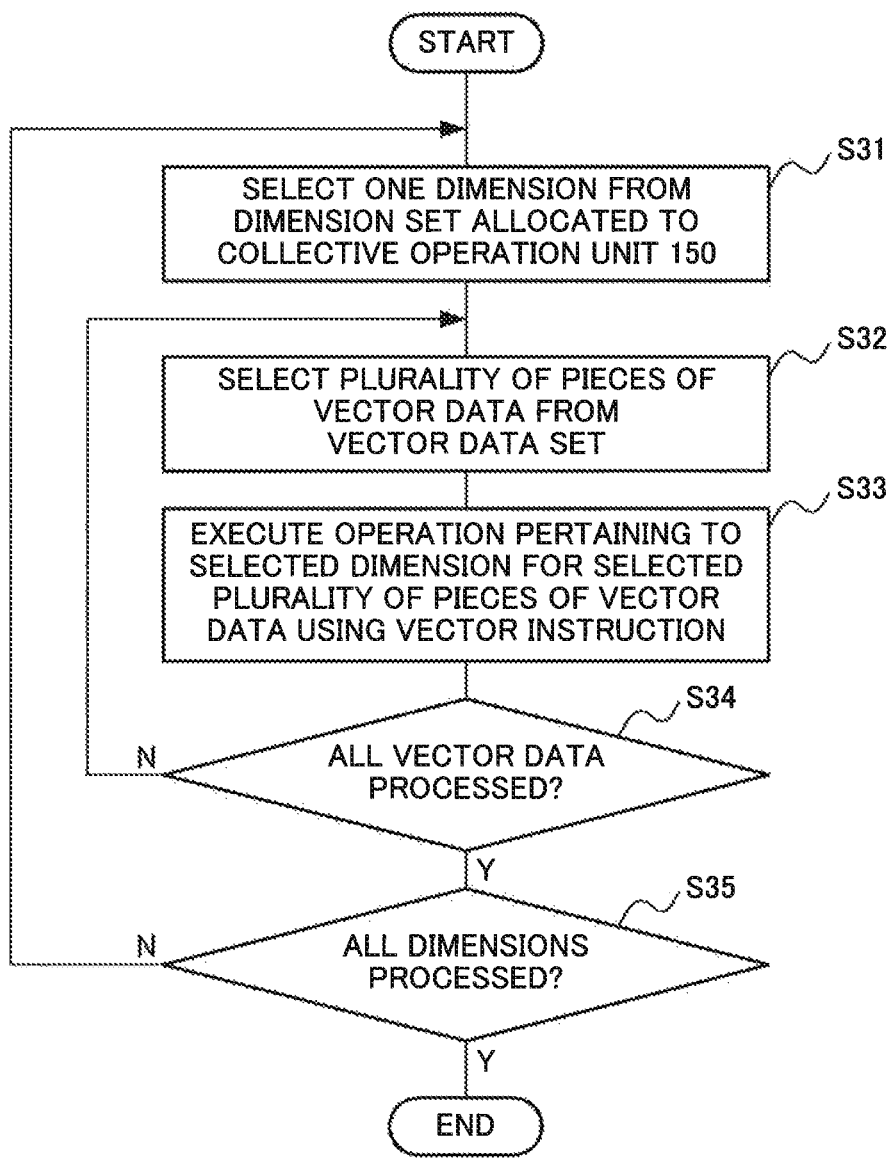
FIG. 8 is a flowchart illustrating collective operation processing according to the first exemplary embodiment of the present invention.

FIG. 8 is a flowchart illustrating the collective operation processing according to the first exemplary embodiment of the present invention.

The dimension control unit 151 selects a dimension from a dimension set allocated to the collective operation unit 150 (step S31).

The set data control unit 152 selects a plurality of pieces of vector data from the vector data set (step S32). As the number of selected pieces of vector data, the number of pieces of data that can be simultaneously processed with a single vector instruction (vector length) or a number lower than the number is used.

The multiple element operation unit 153 simultaneously performs the predetermined operation pertaining to the selected dimension for the selected plurality of pieces of vector data using a vector instruction (step S33).

Here, the multiple element operation unit 153 calculates a difference for elements of the selected dimension between each of the selected plurality of pieces of vector data and the target vector data, and accumulates the difference in the distance storage unit 170. Further, the multiple element operation unit 153 compares the accumulated value and a comparison threshold for each of the selected plurality of pieces of vector data, and stores the comparison result in the result storage unit 180. It should be noted that the multiple element operation unit 153 may compare the accumulated value and a truncation threshold and, when it is not necessary to store the difference and comparison result (when the truncation condition is satisfied), perform mask processing, such as omitting storing into the distance storage unit 170 or the result storage unit 180.

Then, processing from step S32 is repeated for all pieces of the vector data in the vector data set (step S34).

Further, the processing from step S31 is repeated for all the dimensions in the dimension set allocated to the collective operation unit 150 (step S35).

As such, the collective operation unit 150 performs the predetermined operations simultaneously for the selected plurality of pieces of vector data using a vector instruction. The operation is performed regardless of whether the truncation condition is satisfied (whether the operation is necessary).

Next, the individual operation unit 160 performs individual operation processing between each piece of vector data in the vector data set stored in the data set storage unit 130 and the target vector data stored in the target data storage unit 120 for the allocated dimensions (step S4).

Figure 9:
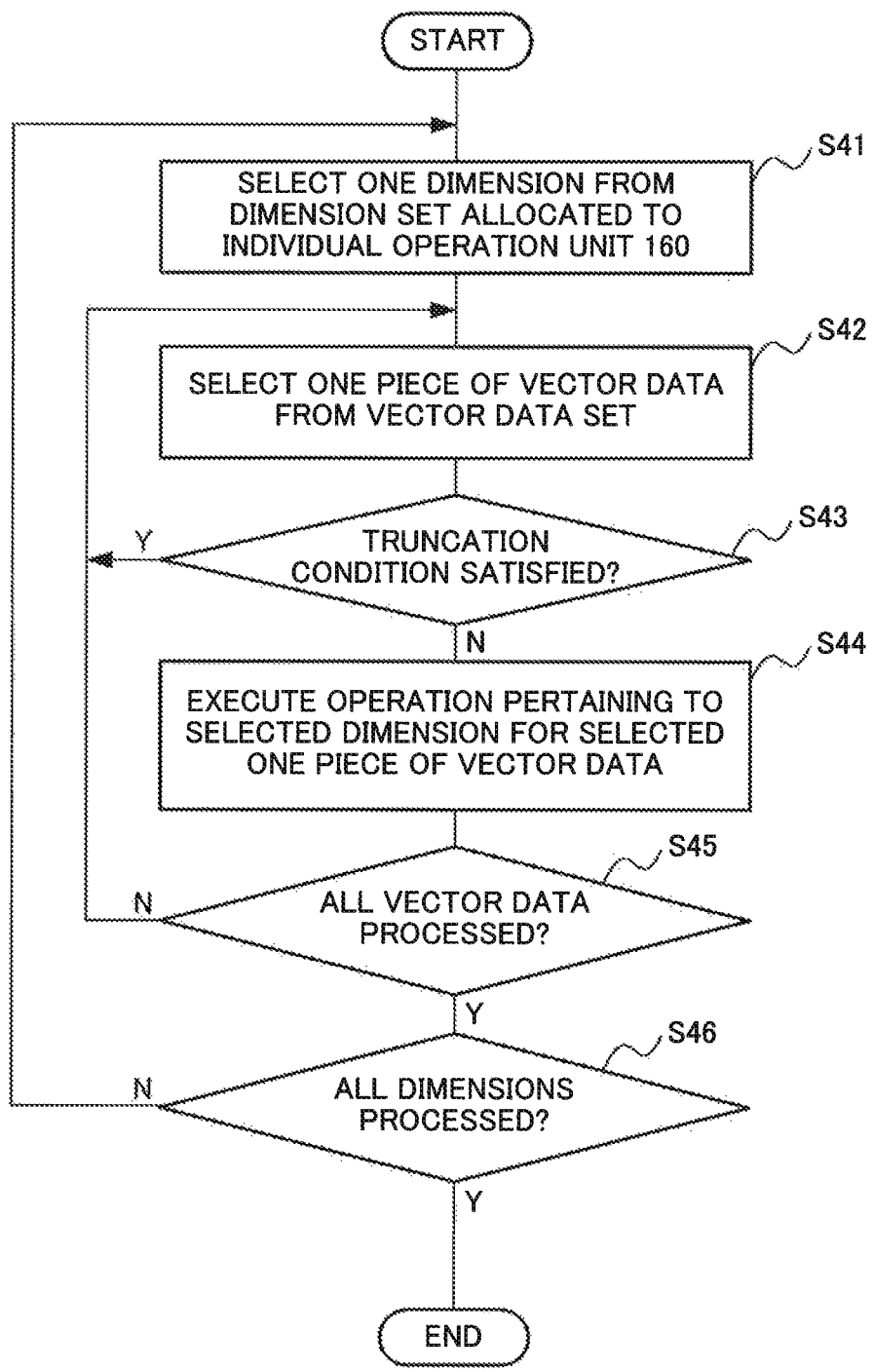
FIG. 9 is a flowchart illustrating individual operation processing according to the first exemplary embodiment of the present invention.

FIG. 9 is a flowchart illustrating individual operation processing according to the first exemplary embodiment of the present invention.

The dimension control unit 161 selects a dimension from a dimension set allocated to the individual operation unit 160 (step S41).

The set data control unit 162 selects a piece of vector data from the vector data set (step S42).

The truncation determination unit 163 refers to the distance storage unit 170 and determines whether the selected one piece of vector data satisfies a truncation condition as the result of the operations for other dimensions (step S43). Here, the truncation determination unit 163 determines that the truncation condition is satisfied when the accumulated value of the differences of the selected piece of vector data is equal to or more than the truncation threshold.

When the truncation condition is satisfied at step S43 (step S43/Y), the processing returns to step S42.

When the truncation condition is not satisfied at step S43 (step S43/N), the single element operation unit 164 performs the predetermined operation pertaining to the selected dimension of the selected one piece of vector data (step S44).

In other word, the single element operation unit 164 calculates a difference for elements of the selected dimension between the selected one piece of vector data and target vector data, and accumulates the difference in the distance storage unit 170. Further, the single element operation unit 164 compares the accumulated value and the comparison threshold for the selected one piece of vector data, and stores the comparison result in the result storage unit 180.

Then, processing from step S42 is repeated for all pieces of the vector data in the vector data set (step S45).

Further, the processing from step S41 is repeated for all the dimensions in the dimension set allocated to the individual operation unit 160 (step S46).

As such, the individual operation unit 160 performs an operation only for vector data elements that do not satisfy the truncation condition.

Next, the result output unit 190 outputs the comparison result stored in the result storage unit 180 to a user or the like as the matching result (step S5).

The above completes the operation of the first exemplary embodiment of the present invention.

In general, a distance between pieces of vector data becomes large as the number of dimensions of which differences are accumulated increases. Thus, when the number of dimensions for which difference calculations have been completed is small, the accumulated value of the differences tends not to satisfy the truncation condition (the proportion of requiring an operation is large). Further, when the number of dimensions for which difference calculations have been completed is large, the accumulated value of the differences tends to satisfy the truncation condition (the proportion of requiring an operation is small).

For a dimension for which the proportion of requiring an operation is large, the collective operation unit 150 is used. In this case, a collective operation is performed using a vector instruction. Thereby it is possible to make operations for a plurality of pieces of vector data efficient. On the other hand, for a dimension for which the proportion of requiring an operation is small, the individual operation unit 160 is used. In this case, difference calculations is performed only for elements that do not satisfy the truncation condition. Thereby unnecessary operations are not performed. As such, the number of unnecessary operations is reduced while utilizing vector instructions.

The following will describe a specific example of the first exemplary embodiment of the present invention.

FIG. 10 is an example of a program of the matching device 100 according to the first exemplary embodiment of the present invention. In the example of FIG. 10, in the same way as the program of FIG. 20, the number of pieces of vector data in a vector data set is 12, and the number of elements in each piece of vector data is 8. Here, u[j][i] is a j-th element of an i-th piece of vector data in a vector data set, v[j] is a j-th element of target vector data.

The program of FIG. 10 includes two double loops; the first double loop corresponds to processing of the collective operation unit 150 (line numbers 4 to 10) and the second double loop corresponds to processing of the individual operation unit 160 (line numbers 12 to 20). In the respective double loops, compiling for vector operation is designated by "#Pragma vector" or "#Pragma novector". A parameter K specifies whether to select the collective operation unit 150 or the individual operation unit 160 for each dimension. In the example of FIG. 10, since it is known that the proportion of requiring a predetermined operation is small enough (the probability that an operation is determined as unnecessary in truncation determination is high) for dimensions other than the first dimension, K is set to 1.

T is a comparison threshold. When a distance d is smaller than T, the i-th piece of vector data in the vector data set and target vector data are determined as coinciding with each other. T may be a variable or a constant. In addition, the comparison threshold T is also used as a truncation threshold.

Figures 19, 20:
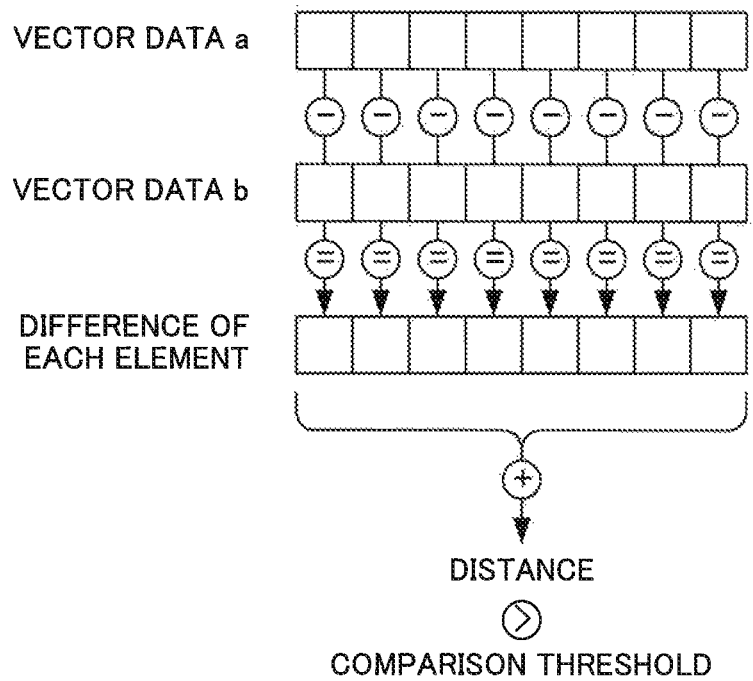
FIG. 19 is a diagram illustrating an example of calculating a distance between pieces of vector data in typical matching processing.
FIG. 20 is an example of a typical matching processing program.
Figures 21, 22:
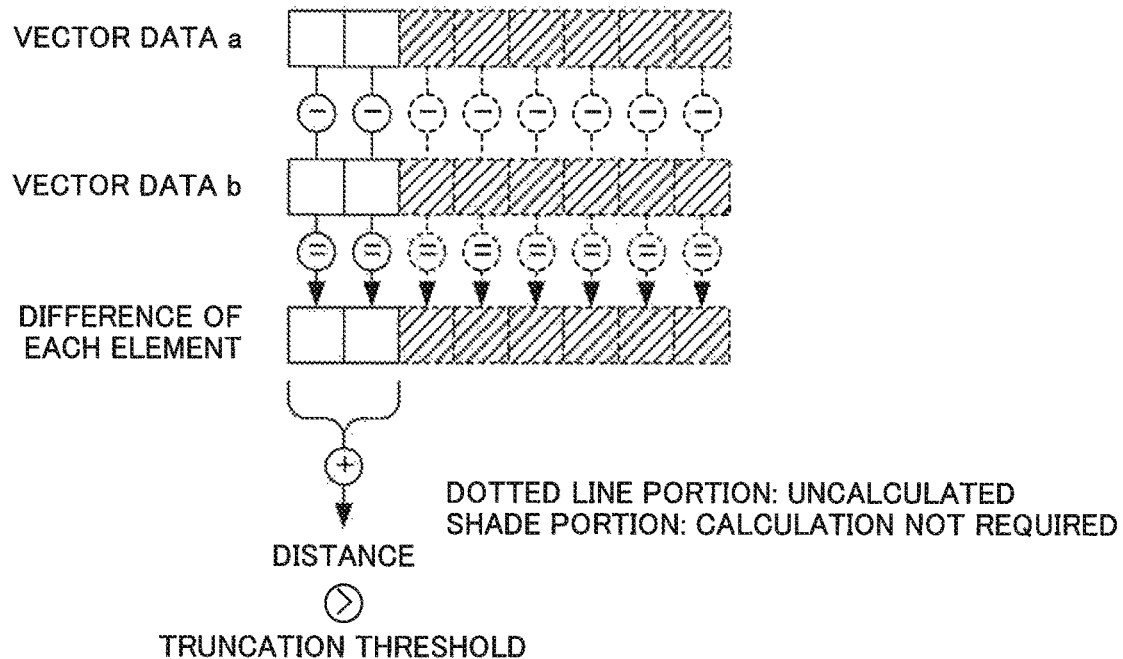
FIG. 21 is a diagram illustrating an application example of truncation determination in typical matching processing.
FIG. 22 is an example of a program that applied truncation determination in typical matching processing.
Figure 23:
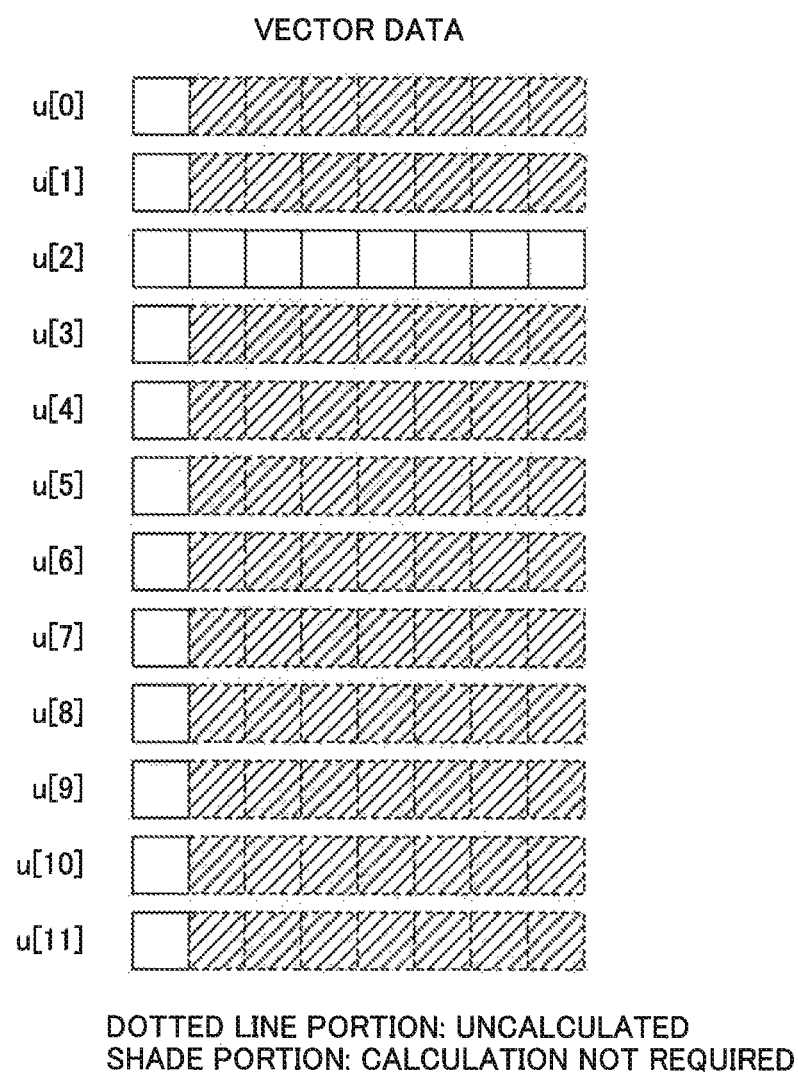
FIG. 23 is a diagram illustrating an example of elements, for which difference calculations are performed, when truncation determination is applied in typical matching processing.
Figure 24:
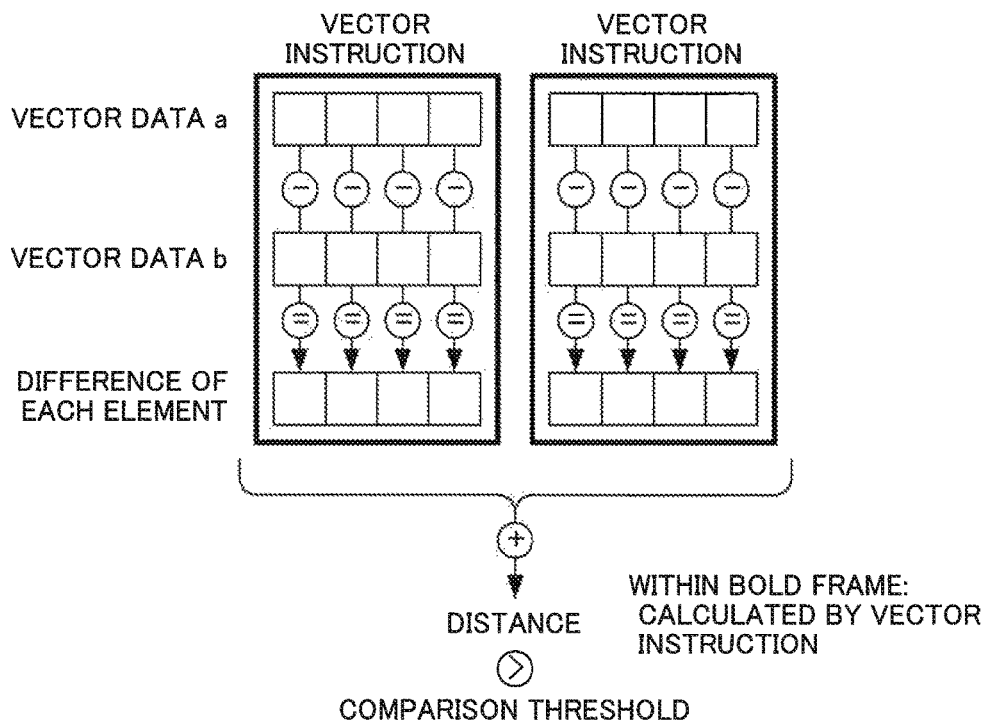
FIG. 24 is a diagram illustrating an application example of a vector instruction in typical matching processing.
Figure 25:
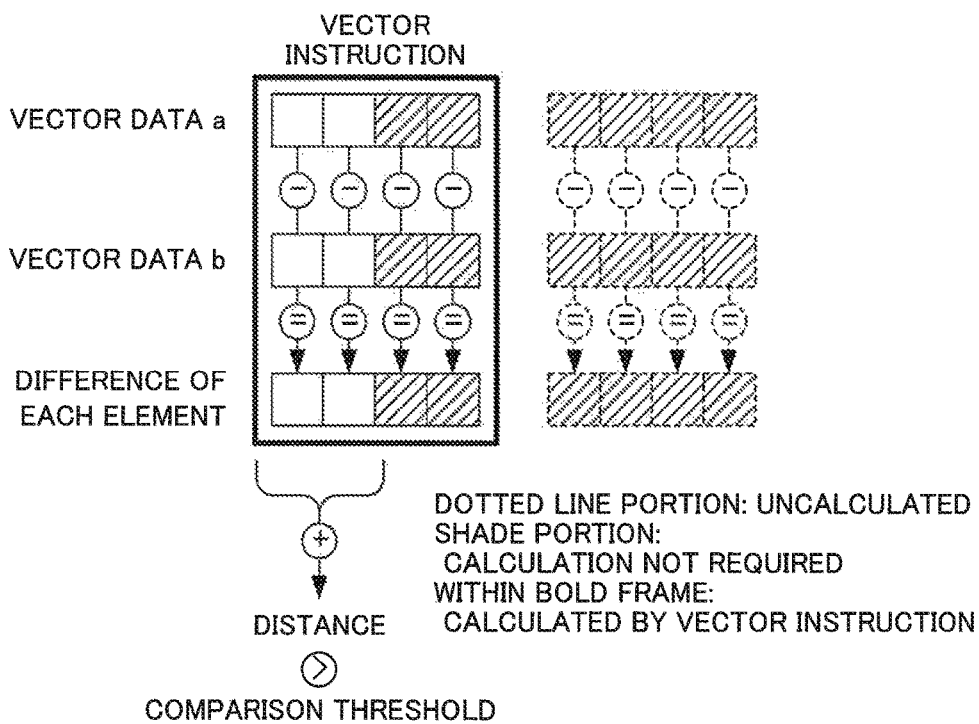
FIG. 25 is a diagram illustrating an application example of truncation determination and a vector instruction in typical matching processing.
Figure 26:
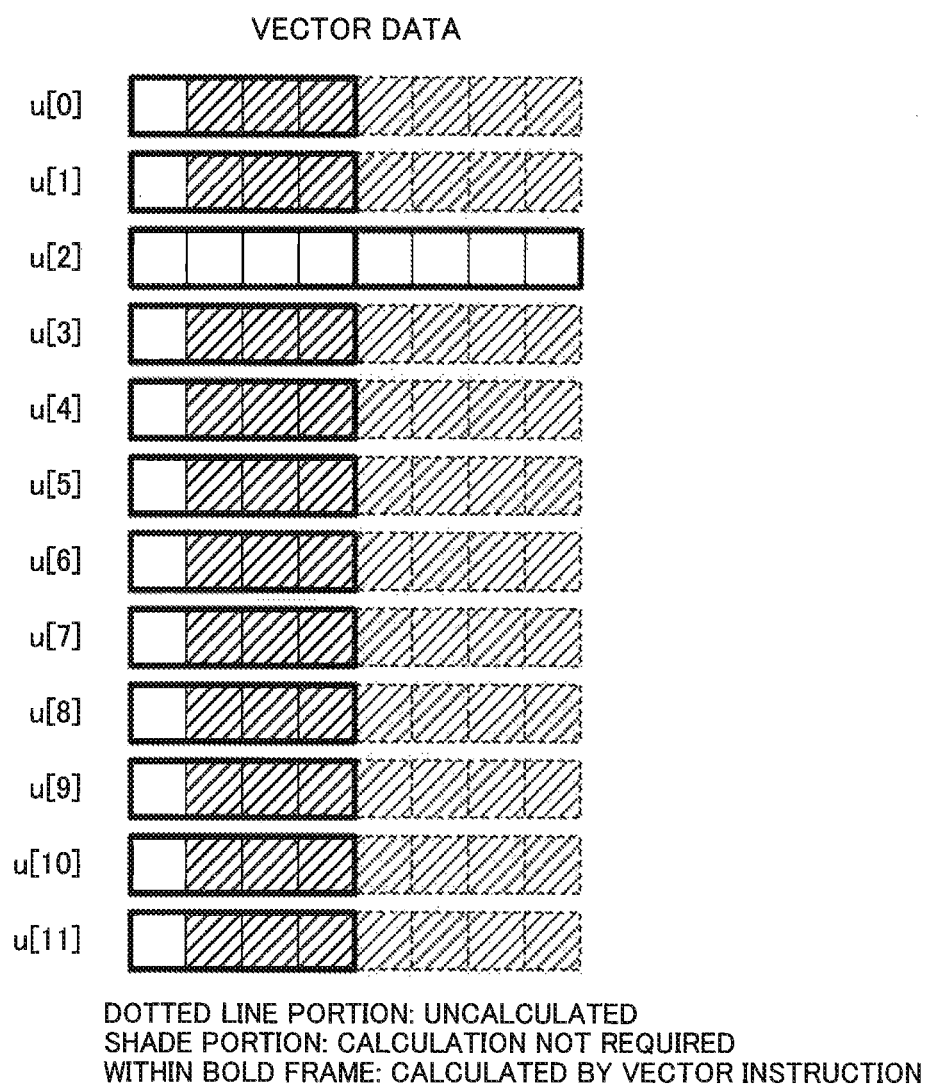
FIG. 26 is a diagram illustrating an example of elements, for which difference calculations are performed, when truncation determination and vector instructions are applied in typical matching processing.

It should be noted that, in the program of FIG. 10, since a vector data set is stored in the recording medium as illustrated in FIG. 5, the vector data set u is transposed compared with the program of FIG. 20. Further, unlike the program of FIG. 20, the loop pertaining to dimensions exists outside of the loop pertaining to vector data in a vector data set.

Figure 11:
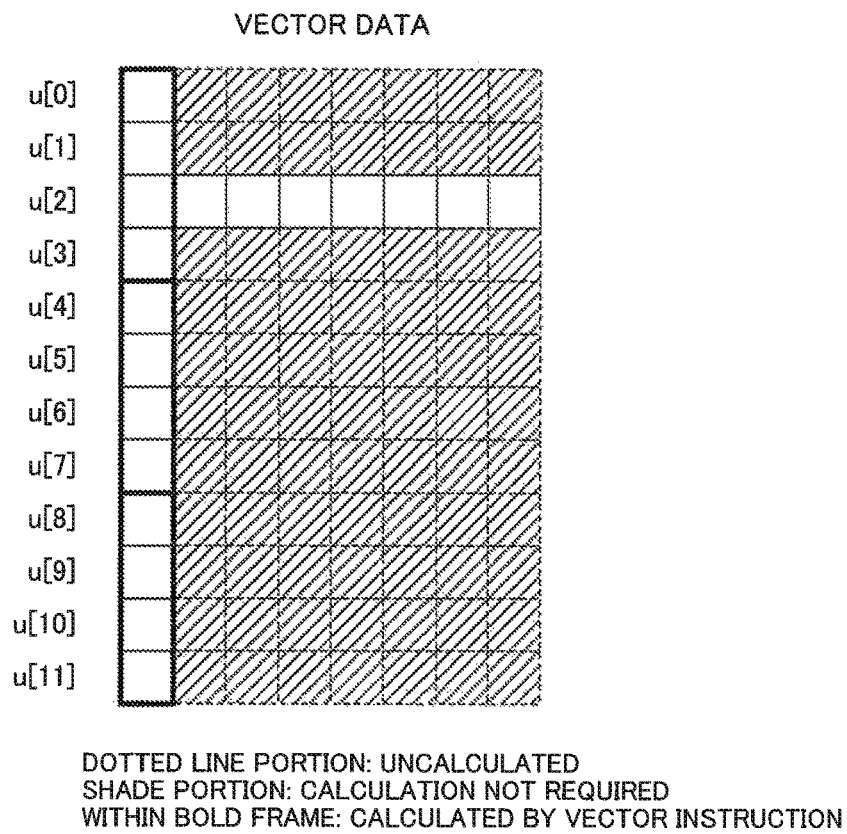
FIG. 11 is a diagram illustrating an example of elements, for which operations are performed, according to the first exemplary embodiment of the present invention.

FIG. 11 is a diagram illustrating an example of elements, for which operations are performed, according to the first exemplary embodiment of the present invention. In the example of FIG. 11, the elements indicated by shades represent elements, for which the predetermined operations are not required; the elements within a bold frame indicate elements, for which the predetermined operations are simultaneously performed using a vector instruction by the collective operation unit 150; and the other elements represent elements, for which the predetermined operations are performed by the individual operation unit 160. In this case, for the first dimension elements, the predetermined operations are performed using a vector instruction in the direction of different pieces of vector data in the vector data set. For the second and following dimension elements, the predetermined operations are performed while performing truncation determination. Then, operations are performed by 10 time instructions for 19 elements, for which the predetermined operations are required. Such processing reduces the number of times of unnecessary operations and accelerates matching processing.

It should be noted that, in the example of FIGS. 10 and 11, the number of pieces of vector data in a vector data set is 12. In general, the number of pieces of vector data tends to be large. In particular, when the proportion of requiring operations is sufficiently small for dimensions other than the first dimension, the acceleration degree of the present invention becomes greater than the case when the present invention is not applied.

In the first exemplary embodiment of the present invention, an exemplary case of calculating a difference for each dimension and the accumulated value of the difference has been described as a predetermined operation for acquiring a distance between pieces of vector data. However, without limitation to the above case, other methods may be used, as a predetermined operation, for calculating a distance between pieces of vector data based on the calculation result of each dimension. Further, other values than a distance may be calculated for matching vector data against other vector data.

Figure 12:
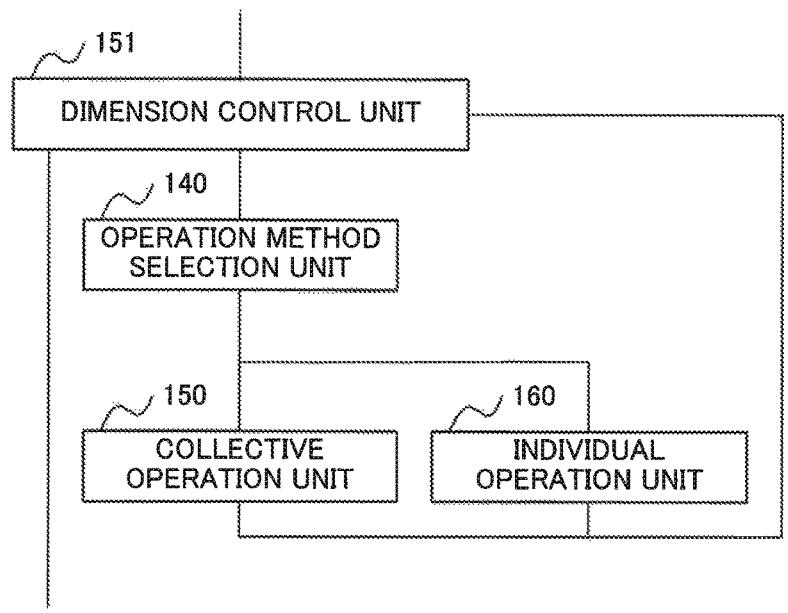
FIG. 12 is a block diagram illustrating another configuration of the collective operation unit 150 and the individual operation unit 160 according to the first exemplary embodiment of the present invention.

FIG. 12 is a block diagram illustrating another configuration of the collective operation unit 150 and the individual operation unit 160 according to the first exemplary embodiment of the present invention.

In FIGS. 3 and 4, the collective operation unit 150 and the individual operation unit 160 respectively include the dimension control units 151 and 161. However, without limitation to FIGS. 3 and 4, a common dimension control unit 151 may exist outside the collective operation unit 150 and the individual operation unit 160 as illustrated in FIG. 12.

In FIG. 12, the processing of the operation method selection unit 140 is performed after the processing of the dimension control unit 151. In this case, the operation method selection unit 140 selects whether to use the collective operation unit 150 or the individual operation unit 160 for a dimension selected by the dimension control unit 151. The collective operation unit 150 and the individual operation unit 160 calculate a difference for the selected dimension. In this way, the dimension control unit 151 can be commonly used.

Figure 1:
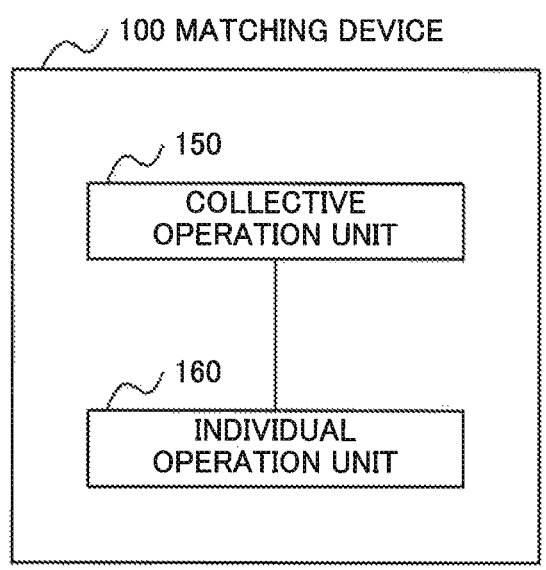
FIG. 1 is a block diagram illustrating a characteristic configuration of a first exemplary embodiment of the present invention.

The following will describe a characteristic configuration of the first exemplary embodiment of the present invention. FIG. 1 is a block diagram illustrating a characteristic configuration of the first exemplary embodiment of the present invention;

A matching device 100 (information processing device) performs, for a plurality of pieces of vector data each having a plurality of dimensions, a predetermined operation pertaining to each dimension of each piece of vector data. The matching device 100 includes a collective operation unit 150 and an individual operation unit 160. The collective operation unit 150 performs the predetermined operation pertaining to a specific dimension among the plurality of dimensions by a vector operation for different pieces of vector data in the plurality of pieces of vector data. The individual operation unit 160 performs the predetermined operation pertaining to each dimension other than the specific dimension for a piece of vector data that satisfies a predetermined condition among the plurality of pieces of vector data.

According to the first exemplary embodiment of the present invention, matching processing between pieces of vector data can be accelerated. This is because the collective operation unit 150 performs a predetermined operation pertaining to a specific dimension among a plurality of dimensions by a vector operation for different pieces of vector data and the individual operation unit 160 performs the predetermined operation pertaining to a dimension other than the specific dimension for a piece of vector data that satisfies a predetermined condition.

Second Exemplary Embodiment

The following will describe the second exemplary embodiment of the present invention.

Figure 13:
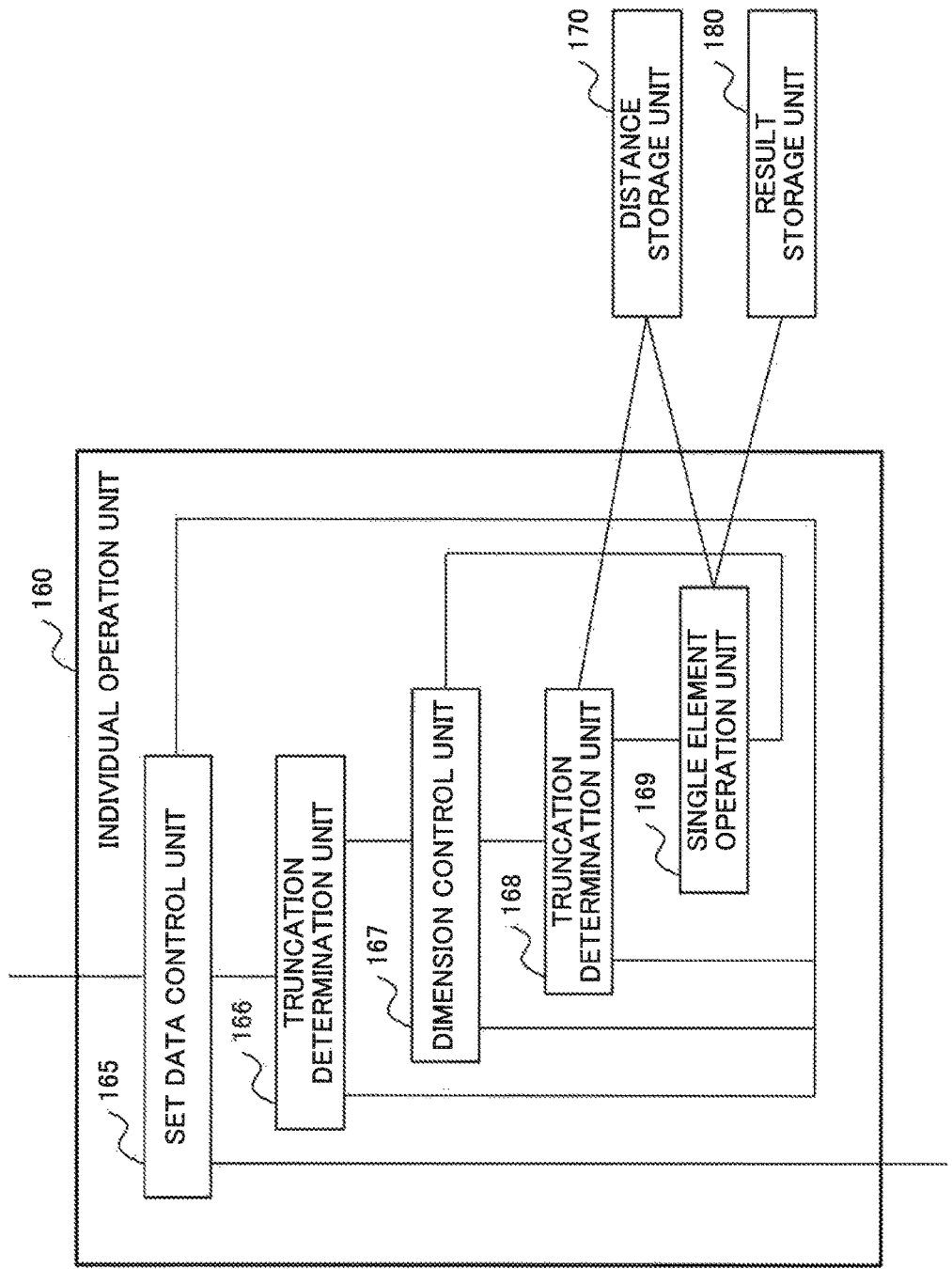
FIG. 13 is a diagram illustrating a configuration of an individual operation unit 160 according to a second exemplary embodiment of the present invention.

FIG. 13 is a diagram illustrating a configuration of an individual operation unit 160 according to the second exemplary embodiment of the present invention.

The individual operation unit 160 of the second exemplary embodiment of the present invention includes a set data control unit 165, a truncation determination unit 166, a dimension control unit 167, a truncation determination unit 168, and a single element operation unit 169. The individual operation unit 160 according to the second exemplary embodiment of the present invention differs from the first exemplary embodiment of the present invention in that the individual operation unit 160 continuously performs operations for dimensions allocated to the individual operation unit 160 for a piece of vector data that is selected from among a vector data set.

The set data control unit 165 selects a piece of vector data one by one from a vector data set. The truncation determination unit 166 performs truncation determination for the selected one piece of vector data. The dimension control unit 167 selects a dimension one by one from a dimension set allocated to the individual operation unit 160. The truncation determination unit 168 performs truncation determination for the selected dimension. When the truncation determination unit 168 determines that an operation is necessary, the single element operation unit 169 performs the operation pertaining to the selected dimension for the selected one piece of vector data. When the truncation determination unit 166 or 168 determines that the operation is not necessary, the processing is returned to the set data control unit 165.

In this way, the processing of the dimension control unit for selecting a next dimension, which is carried out in the first exemplary embodiment, is not performed for the pieces of vector data, for which the truncation determination unit 166 or 168 once determined that an operation is not required. This reduces the processing amount for the part of the dimension control unit. Thus, matching processing is further accelerated when the operation amount of a predetermined operation pertaining to the matching processing is relatively small and the proportion of the processing amount of the dimension control unit among the whole processing amount is large.

Figure 14:
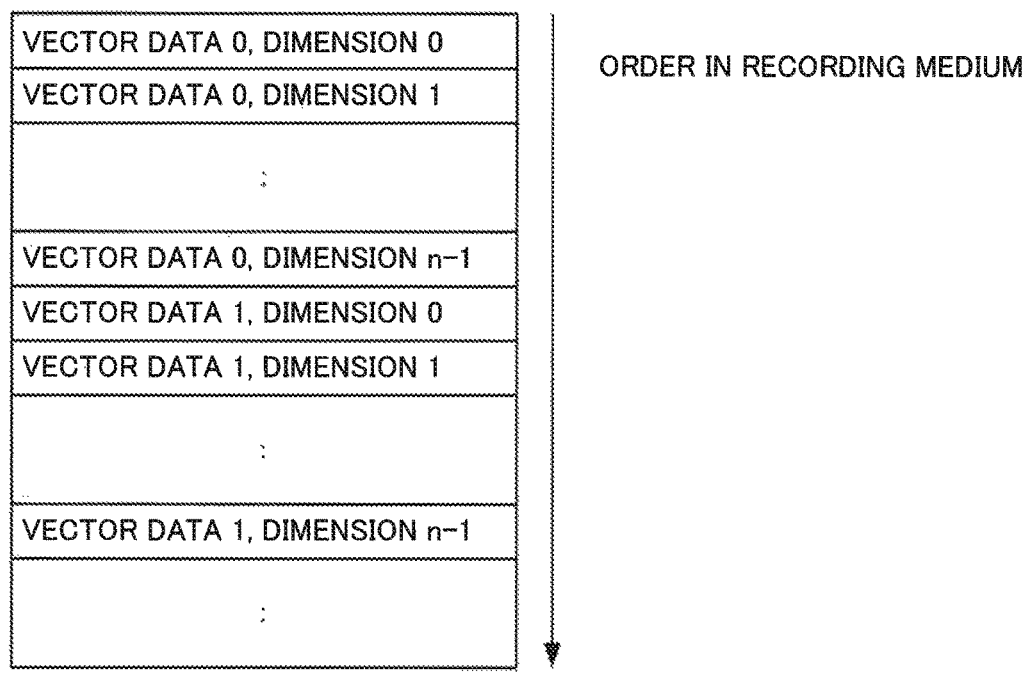
FIG. 14 is a diagram illustrating an example of a method of storing a vector data set in the recording medium according to the second exemplary embodiment of the present invention.

FIG. 14 is a diagram illustrating an example of a method of storing a vector data set in the recording medium according to the second exemplary embodiment of the present invention. In FIG. 14, n indicates the number of dimensions.

The individual operation unit 160 of the second exemplary embodiment of the present invention continuously performs operations for different dimensions of the same piece of vector data. Thus, as a method of storing a vector data set in a recording medium, a method of continuously storing elements of respective dimensions of the same piece of vector data is preferable as in FIG. 14. On the other hand, since the collective operation unit 150 performs the same operation as the first exemplary embodiment of the present invention, the elements of different pieces of vector data pertaining to the same dimension may preferably be continuously stored as in FIG. 5. Thus, in the second exemplary embodiment of the present invention, the data set storage unit 130 may store a vector data set by both methods of FIGS. 5 and 14, which are respectively used by the collective operation unit 150 and the individual operation unit 160.

The following will describe a specific example of the second exemplary embodiment of the present invention.

FIG. 15 is an example of a program of a matching device 100 according to the second exemplary embodiment of the present invention. In the example of FIG. 15, compared with the first exemplary embodiment of the present invention, the inner loop and the outer loop of the second double loop (line numbers, 12 to 23) corresponding to the processing of the individual operation unit 160 are switched, and truncation determination (line numbers 17 and 18) are performed in the loop for dimensions (the inner loop). When the number of dimensions of vector data is large and operations are performed for a substantial number of times before truncation determination determines that an operation is not required, the inner loop may be performed by a vector instruction.

According to the second exemplary embodiment of the present invention, the matching processing can be further accelerated compared with the first exemplary embodiment of the present invention. This is because the individual operation unit 160 continuously performs operations for respective dimensions allocated to the individual operation unit 160 for a piece of vector data that is selected from among a vector data set.

Third Exemplary Embodiment

The following will describe the third exemplary embodiment of the present invention.

Figure 16:
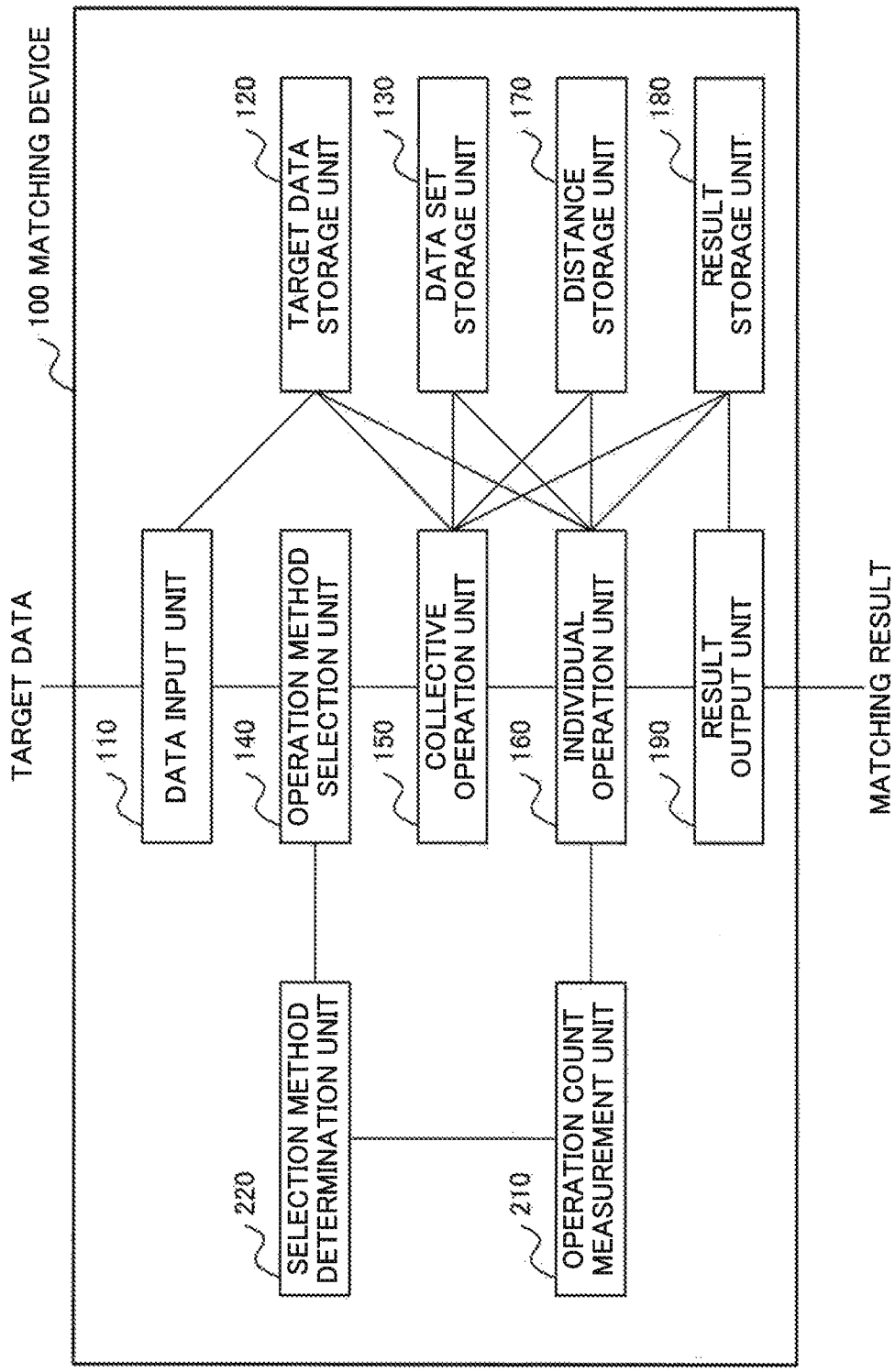
FIG. 16 is a block diagram illustrating a configuration of a matching device 100 according to a third exemplary embodiment of the present invention.

FIG. 16 is a block diagram illustrating a configuration of a matching device 100 according to the third exemplary embodiment of the present invention.

The matching device 100 according to the third exemplary embodiment of the present invention includes an operation count measurement unit 210 and a selection method determination unit 220 (or a dimension determination unit) in addition to the components of the matching device 100 of the first exemplary embodiment of the present invention.

The operation count measurement unit 210 measures, for each dimension, the number of times that the individual operation unit 160 performed predetermined operations and the number of times that the operations were not performed due to truncation determination. The selection method determination unit 220 determines a selection method (whether to select the collective operation unit 150 or the individual operation unit 160) employed by an operation method selection unit 140 on the basis of the number of times that the individual operation unit 160 performed the predetermined operations or the proportion of the number of times to the number of pieces of vector data. For example, when the number of times or proportion of performing the operations are large (equal to or more than a predetermined value) for a certain dimension, the selection method determination unit 220 instructs the operation method selection unit 140 to select the collective operation unit 150 for the dimension.

The proportion in which the individual operation unit 160 performs the operations is large for a certain dimension means that the operations for such a dimension may be performed by the collective operation unit 150 with little loss. Therefore, in this case, matching processing can be further accelerated by performing the operations for the dimension using the collective operation unit 150.

The following will describe a specific example of the third exemplary embodiment of the present invention.

FIG. 17 is an example of a program of the matching device 100 according to the third exemplary embodiment of the present invention. In the example of FIG. 17, the selection method is determined in such a way that the collective operation unit 150 is selected for a dimension, for which the number of times of the operations performed by the individual operation unit 160 is equal to or more than C times (line numbers 25 to 28).

It should be noted that the operation count measurement unit 210 may count the number of times of unnecessary operations performed by the collective operation unit 150 for each dimension, instead of the number of times of the operations performed by the individual operation unit 160. In this case, the selection method determination unit 220 instructs the operation method selection unit 140 to select the individual operation unit 160 for dimensions of which proportion of the unnecessary operations performed by the collective operation unit 150 is large.

Further, the selection method employed by the operation method selection unit 140 may be determined using the operation time duration of the collective operation unit 150 or the individual operation unit 160, instead of the number of times of operations that the collective operation unit 150 or the individual operation unit 160 performed.

Figure 18:
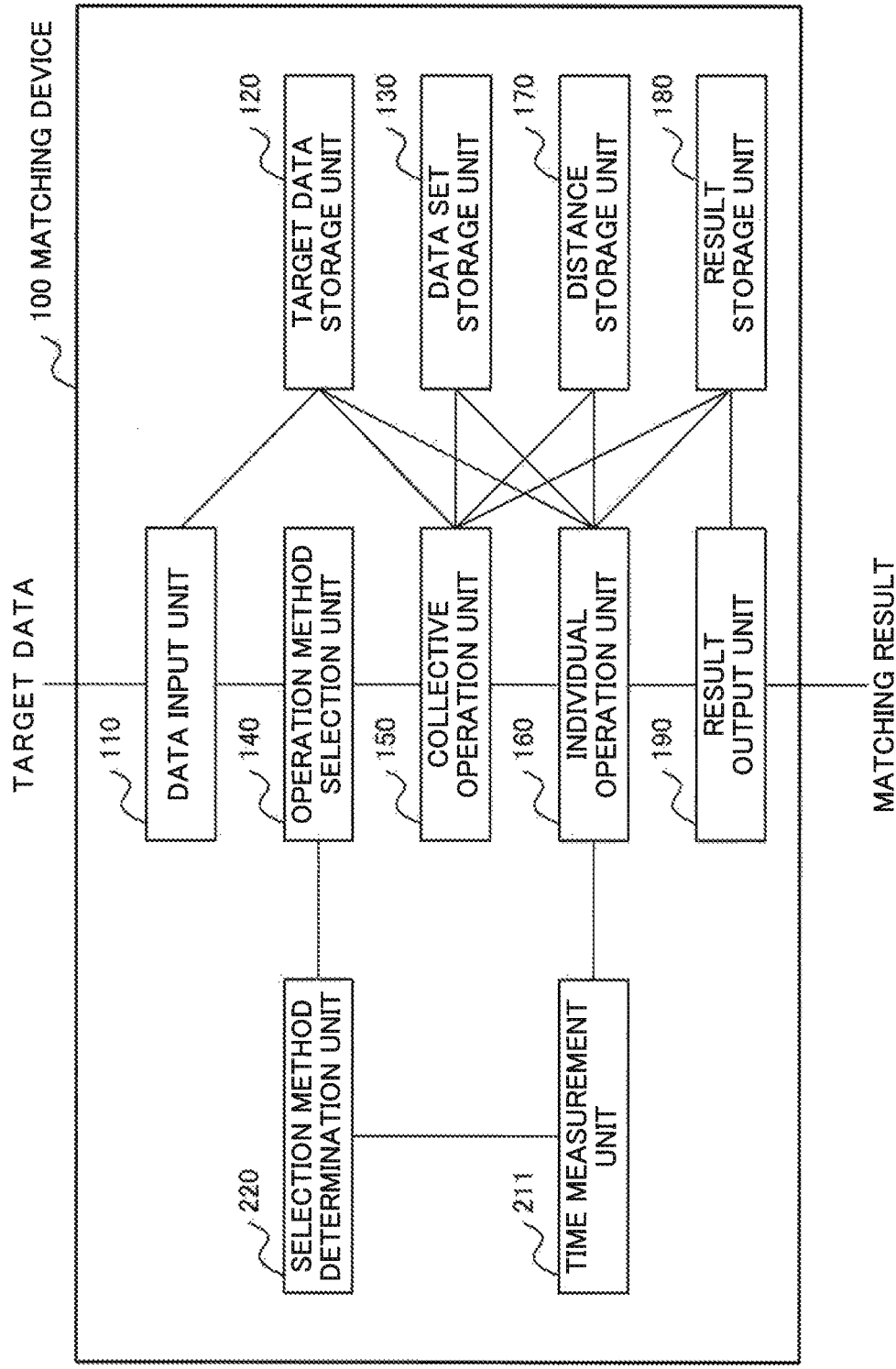
FIG. 18 is a block diagram illustrating another configuration of the matching device 100 according to the third exemplary embodiment of the present invention.

FIG. 18 is a block diagram illustrating another configuration of the matching device 100 according to the third exemplary embodiment of the present invention.

The matching device 100 of FIG. 18 includes a time measurement unit 211 instead of the operation count measurement unit 210. The time measurement unit 211 measures the processing time of the collective operation unit 150 and the individual operation unit 160 for each dimension. The selection method determination unit 220 determines a selection method of the operation method selection unit 140 on the basis of the processing time of the collective operation unit 150 and the individual operation unit 160 for each dimension. For example, when processing time becomes longer as the result of changing a selection method for a certain dimension from the individual operation unit 160 to the collective operation unit 150, the selection method determination unit 220 changes back the selection method to the individual operation unit 160.

According to the third exemplary embodiment of the present invention, the matching processing can be further accelerated compared with the first exemplary embodiment of the present invention. This is because the selection method determination unit 220 determines a selection method employed by the operation method selection unit 140 on the basis of the number of times or proportion that the individual operation unit 160 performed predetermined operations for each dimension.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

For example, the exemplary embodiments of the present invention have been described with exemplary cases where an information processing device matches vector data against other vector data, as processing for vector data. However, processing for vector data may be other processing than matching as long as the processing performs a predetermined operation pertaining to each dimension of multidimensional vector data, for a plurality of pieces of vector data.

This application is based upon and claims the benefit of priority from Japanese Patent Application No. 2014-125864, filed on Jun. 19, 2014, the disclosure of which is incorporated herein in its entirety by reference.

INDUSTRIAL APPLICABILITY

The present invention can be used for matching against a database using feature vectors, such as an image searching system.

REFERENCE SIGNS LIST

100 Matching device
101 CPU
102 Storage means
103 Communication means
104 Input means
105 Output means
110 Data input unit
120 Target data storage unit
130 Data set storage unit
140 Operation method selection unit
150 Collective operation unit
151 Dimension control unit
152 Set data control unit
153 Multiple element operation unit
160 Individual operation unit
161 Dimension control unit
162 Set data control unit
163 Truncation determination unit
164 Single element operation unit
165 Set data control unit
166 Truncation determination unit
167 Dimension control unit
168 Truncation determination unit
169 Single element operation unit
170 Distance storage unit
180 Result storage unit
190 Result output unit
210 Operation count measurement unit
211 Time measurement unit
220 Selection method determination unit

What is claimed is:

1. An information processing device that performs, for a plurality of pieces of vector data each having a plurality of dimensions, a predetermined operation pertaining to each dimension of each piece of vector data, the information processing device comprising:
   a collective operation unit that performs the predetermined operation pertaining to a specific dimension among the plurality of dimensions by a vector operation for different pieces of vector data in the plurality of pieces of vector data; and
   an individual operation unit that performs the predetermined operation pertaining to each dimension other than the specific dimension for a piece of vector data that satisfies a predetermined condition among the plurality of pieces of vector data.

2. The information processing device according to claim 1, wherein
   the specific dimension is a dimension, of which order of performing the predetermined operation is equal to or less than a predetermined value, among the plurality of dimensions.

3. The information processing device according to claim 1, further comprising:
   a dimension determination unit that determines the specific dimension depending on a performing status of the predetermined operation in at least one of the collective operation unit and the individual operation unit.

4. The information processing device according to claim 3, wherein, the dimension determination unit includes, when the number of times or proportion of the predetermined operation performed by the individual operation unit is equal to or more than a predetermined value for a dimension other than the specific dimension, the dimension in the specific dimension.

5. The information processing device according to claim 1, wherein
   the predetermined operation includes a calculation of a difference between pieces of vector data for each dimension and a calculation of an accumulated value of the difference, and
   the individual operation unit performs the predetermined operation for vector data of which the accumulated value of the difference is less than a predetermined truncation threshold as the predetermined condition.

6. A vector data processing method for performing, for a plurality of pieces of vector data each having a plurality of dimensions, a predetermined operation pertaining to each dimension of each piece of vector data, the vector data processing method comprising:
   performing collective operation processing that performs the predetermined operation pertaining to a specific dimension among the plurality of dimensions by a vector operation for different pieces of vector data in the plurality of pieces of vector data; and performing individual operation processing that performs the predetermined operation pertaining to each dimension other than the specific dimension for a piece of vector data that satisfies a predetermined condition among the plurality of pieces of vector data.

7. The vector data processing method according to claim 6, wherein
the specific dimension is a dimension, of which order of performing the predetermined operation is equal to or less than a predetermined value, among the plurality of dimensions.

8. The vector data processing method according to claim 6, further comprising:
determining the specific dimension depending on a performing status of the predetermined operation in at least one of the collective operation processing and the individual operation processing.

9. The vector data processing method according to claim 8, wherein, when the number of times or proportion of the predetermined operation performed by the individual operation processing is equal to or more than a predetermined value for a dimension other than the specific dimension, the dimension is included in the specific dimension.

10. A non-transitory computer readable storage medium recording thereon a program for a computer for performing, for a plurality of pieces of vector data each having a plurality of dimensions, a predetermined operation pertaining to each dimension of each piece of vector data, the program causing the computer to execute processes comprising:
a process for performing the predetermined operation pertaining to a specific dimension among the plurality of dimensions by a vector operation for different pieces of vector data in the plurality of pieces of vector data; and
a process for performing the predetermined operation pertaining to each dimension other than the specific dimension for a piece of vector data that satisfies a predetermined condition among the plurality of pieces of vector data.

\* \* \* \* \*